Nov. 8, 1955
F. R. DUNCAN
2,722,964
WELDER TIP OR NOZZLE
Filed Dec. 4, 1953
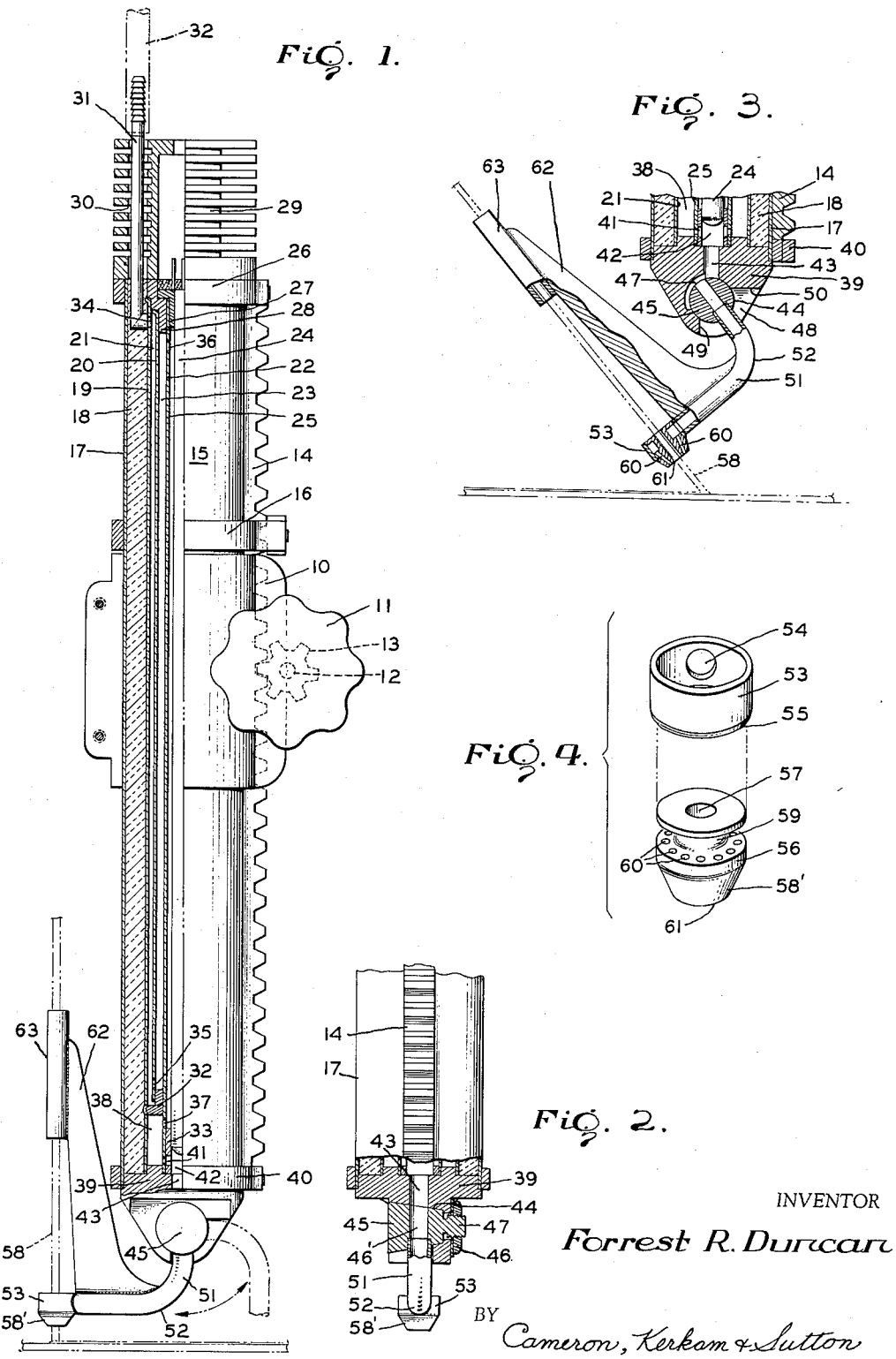
INVENTOR
*Forrest R. Duncan*
BY
*Cameron, Kerkam & Sutton*
ATTORNEYS

United States Patent Office 2,722,964
Patented Nov. 8, 1955

2,722,964

WELDER TIP OR NOZZLE

Forrest R. Duncan, Oak Ridge, Tenn., assignor of three-eighteenths to R. A. Jarnagin, five-eighteenths to Vincent H. Moore, and five-eighteenths to W. K. Prater, all of Knoxville, Tenn.

Application December 4, 1953, Serial No. 396,095

9 Claims. (Cl. 154—42)

This invention relates to the welding of joints between sheets of plastic material or joints in configurations formed of plastic material and more particularly relates to apparatus for forming such welds.

It has heretofore been proposed to form welds in plastic material by heating the edges of the weld by a blast of hot gas and at the same time fill the seam from a weld rod of plastic material also held in the blast of hot gas. In this procedure the welder has directed the blast of hot gas along the seam with one hand and has moved the welding rod of plastic material along the seam with his other hand. This type of manual operation requires great dexterity and experience because the distance of the source of hot gas from the seam, the angle of the welding rod with respect to the seam, and the speed of movement of the blast of hot gas and of the welding rod along the seam all are critical in executing a perfect weld.

For example, when a polyethylene welding rod is employed it should be held at an angle of approximately 45° to the direction of the seam and the source of hot gas should be directed on the seam and on the end of the welding rod at an approximately 45° angle in the opposite direction and the source of hot gas should be maintained at approximately one quarter of an inch from the surface of the plastic material being welded. If a polyvinyl chloride welding rod is employed it should be held in approximately a vertical position as it is moved along the seam being welded.

The requirements for various plastic material to create a perfect weld limit the speed of the welder and introduce opportunities for human error and fatigue resulting in imperfect welds.

The present invention is directed to welding apparatus for welding seams in plastic material which overcomes the difficulties heretofore inherent in manual welding of such seams. The present invention includes a novel tip or nozzle construction for welding apparatus for welding seams in plastic material which overcome many of the difficulties heretofore inherent in hand welding and at the same time increases the speed of the welding operation many-fold. This tip or nozzle is so constructed that the welding rod of plastic material may be adjusted for any desired angularity with respect to the seam being welded and the hot gases directed through the nozzle at the point of impingement of the welding rod with the seam to obtain optimum heating at the spot where the weld is being formed. Once this adjustment is initially made it is maintained for the entire welding operation and a minimum of manual dexterity and experience is required on the part of the operator of this welding apparatus.

It is accordingly an object of the present invention to provide a novel tip or nozzle for welding apparatus for plastic material which holds the welding rod with respect to the seam being welded at the desired angularity; which maintains such angularity during the welding operation; and which discharges the hot gases to effect the weld in the optimum position around the welding rod and with respect to the seam to provide a uniform and smooth weld.

Another object is to provide such a tip or nozzle which is adjustable to provide any desired angularity of the welding rod with respect to the seam being welded and which may be adjusted for desired height above the seam.

Another object is to provide such a tip or nozzle which because of the optimum welding conditions which it affords increases the speed of welding many-fold.

Another object is to provide such a tip or nozzle which can be used by unskilled and inexperienced operators and yet produce a uniform and smooth weld.

Another object is to provide such a tip or nozzle which is readily made and relatively inexpensive to manufacture and use.

Other and further objects of the present invention will appear from the following description of an illustrative embodiment thereof.

The tip or nozzle of the present invention is capable of various mechanical embodiments and one of these is shown in the accompanying drawing and is described hereinafter to illustrate the invention. It should be expressly understood that this illustrative embodiment of the present invention should in no way be construed as defining or limiting the same and reference should be had to the appended claims to determine the scope of the present inventive concept.

In the accompanying drawings, in which like reference characters indicate like parts, Fig. 1 is a vertical view, of welding apparatus including an illustrative embodiment of the tip or nozzle of the present invention and showing the heater for the welding gas or gases in partial section;

Fig. 2 is a partial view partially in section of the embodiment of Fig. 1 adjacent the lower extremity thereof as seen from the right in Fig. 1 to show the construction of the joint permitting angular adjustment of the nozzle with respect to the seam being welded;

Fig. 3 is a partial sectional view of the illustrative embodiment of the tip or nozzle as seen in Fig. 1 to show the gas passages in the nozzle and the position of the several elements thereof when the nozzle is arranged to impinge the welding rod at an angle of approximately 45° to the length of the seam; and Fig. 4 is an exploded view of a portion of the nozzle of the embodiment of Fig. 1 to show the construction for directing the hot welding gases uniformly about the welding rod.

Referring now more particularly to Fig. 1, an illustrative embodiment of the novel tip or nozzle of the present invention is there shown with a suitable heater for the welding gases to be employed such as air, nitrogen, carbon dioxide and the like. The welding gas heater is mounted in a supporting bracket for vertical adjustment, it being understood that this bracket may be fixed in position so that the seam to be welded may be moved under the welding tip, or the bracket may be mounted upon a suitable moveable carriage so that the welding tip may be moved over the seam being welded, or the bracket may be supported manually and moved along the seam. Since such suitable supports for this bracket form no part of the present invention they are not included in the drawings to simplify them and to simplify the disclosure of the invention. This bracket is generally indicated at 10 and is provided with a hand wheel 11 which is carried by a shaft 12 journaled in bracket 10. Shaft 12 in turn supports a gear 13 which engages in a suitable rack 14 mounted upon one side of the welding gas heating element generally indicated at 15. Thus by suitable rotation of hand wheel 11 the heating element 15 can be adjusted vertically in bracket 10 and the position of the welding tip with respect to the seam can be suitably regulated as will appear more fully hereinafter. An adjustable stop 16 may be mounted upon the heater 15 to prevent the welding tip from being moved too close to the seam being welded.

Heater 15 for the welding gases comprises an outer cylindrical metallic housing 17 internally lined with a suitable layer of insulating material 18. A hollow cylindrical chamber is provided in heater 15 by the metallic cylindrical liner 19, the outer surface of which is in contact with insulation 18. Mounted within liner 19 and suitably spaced therefrom is a second hollow cylindrical liner 20, the spaced liners 19 and 20 forming between them an annular chamber 21. A third cylindrical liner 22 is mounted within and spaced from liner 20, a second annular cylindrical chamber 23 being formed between liner 20 and liner 22. Any suitable resistance type electrical heating unit 24 is mounted within liner 22 and is spaced therefrom to provide a third cylindrical chamber 25. Heating unit 24 may be supplied with electricity by any suitable means, not shown. It is to be understood that any other suitable type of heating unit may be employed such as those employing combustible fuels.

Heater 15 is closed at its top by a suitable closure 26 which has depending annular flanges 27 and 28, to space heating unit 24, liner 22 and liner 20, respectively. Closure member 26 is provided with a finned extension 29 to dissipate heat leaking therethrough. Finned member 29 is suitably bored at 30 to receive a hollow conduit 31 which in turn connects to tubing 32 through which welding gases to be heated are led into heating unit 15.

The lower end of heating unit 15 is closed by ring member 32 which spaces liner 22 from liner 20 and closes the bottom of chambers 21 and 23. The bottom of chamber 25 is closed by ring 33 which is mounted between the heating unit 24 and liner 22.

Welding gases admitted under pressure into tubing 31 pass through opening 34 into chamber 21 and pass downwardly in chamber 21 to the openings 35 therein passing into the lower end of chamber 23. The gases pass upwardly in chamber 23 and pass out of chamber 23 at its top through opening 36 into chamber 25. The gases pass downwardly in chamber 25 and out the bottom of chamber 25 through openings 37 into an annular chamber 38 formed beneath ring member 32.

The lower end of heating unit 15 and the lower end of chamber 28 is closed by the welding tip base 39. Base 39 is held in position by clamping ring 40 which surrounds the bottom of housing 17 and forces the same into contact with base 39. The welding gases in chamber 38 pass inwardly therefrom through openings 41 into the central chamber 42 beneath the heating element 24.

By providing the several chambers 21, 23 and 25 and by staggering the openings between the tops and bottoms of these chambers the welding gases are made to pass through the longest possible path in the heating element 15 to insure heating of the welding gases by heating element 24 up to temperatures approaching 700° F. By this construction it is possible to heat welding gases to these temperatures and to discharge these gases from chamber 42 at velocities up to 1000 feet per second.

Base 39 for the welding tip is provided with a central axial bore 43. Bore 43 communicates with a transversely disposed truncated conical chamber 44 in which is mounted a suitable truncated conically shaped plug 45 which is held in position by nut 46 mounted on threaded portion 47 thereof. The plug member 45 is transversely bored at 46' to form an extension of bore 43. Bore 43 is extended by annular groove 47 in the wall of chamber 44, Fig. 3, so that as plug member 45 is rotated its bore 46' will always be in communication with bore 43.

Base member 39 is suitably cut away at 48 to provide shoulders 49 and 50 for purposes which will be described hereinafter.

A hollow tubular member 51 is secured in plug 45 for rotation therewith and communicates with bore 46' and the interior of the heating element 15 through bore 43. Tubular element 51 may be turned as at 52 to form a right angle with that portion of itself secured in plug 45.

A hollow cylindrical casing 53 is secured to the outer end of tube 51 and tube 51 communicates with the interior thereof through opening 54. Casing 53 may be suitably beveled on its lower edge as at 55. A thimble 56 is secured within casing 53 and is provided with a central axial bore 57 through which a suitable plastic welding rod, generally indicated at 58, is fed. The lower end of thimble 56 is beveled at 58' to form a continuation of the bevel 55 of casing 53. A circumferential annular groove 59 is provided in thimble 56 which with the interior surface of casing 53 forms an annular chamber communicating with aperture 54 and tube 51. A plurality of circumferentially disposed jet holes or conduits 60 are provided in the lower part of thimble 56 opening into recess 59 and discharging through the bottom 61 of thimble 56 around bore 57. Since passages 60 are circumferentially disposed in thimble 56 around the lower end of axial bore 57 the hot welding gases from heater 15, which pass through tube 51 into casing 53, are thus distributed equally about the welding rod 58 adjacent its area of contact with the seam to be welded.

A web 62 is secured to tube 51 and supports a guide member 63 through which the plastic welding rod 58 passes before it enters thimble 56.

It should be particularly noted that any suitable means may be employed for feeding the welding rod 58 through guide 63 and through the tip or nozzle formed by casing 53 and thimble 56. This feed may be either mechanical or manual and well known and conventional mechanical feeding means are available and have been employed for this purpose.

As pointed out above, and depending upon the plastic material of the rod, the plastic welding rods 58 should be maintained at various angles with the length of the seam being welded if a smooth and perfect weld is to be obtained. A polyethylene plastic welding rod should be moved along the seam being welded at approximately a 45° angle thereto while a polyvinyl chloride welding rod should be moved along the seam at approximately a right angle thereto during the welding operation. The desired angularity of the welding rod with respect to the seam being welded can be obtained with the welding tip of the present invention by rotating tube 51 and plug 45 between the stops provided by shoulders 49 and 50. When tube 51 abuts shoulder 49 the welding rod is arranged at approximately a right angle to the seam being welded, as in Fig. 1, while an intermediate position between shoulders 49 and 50 holds the welding rod at an approximate 45° angle to the seam being welded, as shown in Fig. 3. This adjustment of the angularity of the welding tip with respect to the seam together with vertical adjustment of distance of the tip or nozzle above the seam provided by operation of hand wheel 11, as above described, assures that a uniform and smooth weld will be obtained during the entire welding operation.

It will now be apparent that the present invention provides a novel tip or nozzle for plastic welders which in every way satisfies the several objectives discussed above.

Changes in modifications to the above-described illustrative embodiment of this invention may now be suggested to those skilled in the art without departing from the present inventive concept and reference should be had to the appended claims to determine the scope of this invention.

What is claimed is:

1. In welding apparatus for plastic materials including a source of heat for the welding gases having a discharge conduit for the heated gases, a base secured to said source of heat and communicating with the conduit, a tube mounted for rotation in said base and communicating through said base with the discharge conduit, a ring-shaped casing secured to the end of said tube, an axially apertured thimble in said casing to receive a rod of plastic welding material and means in said thimble for directing streams of the welding gas downwardly around the welding rod and onto the material being welded.

2. In welding apparatus for plastic materials including a source of heat for the welding gases having a discharge conduit for the heated gases, a rotatable plug closing said conduit, a tube mounted in said plug for rotation in a vertical plane and communicating with the discharge conduit, an axially bored nozzle secured to and communicating with said tube, the axial bore of said nozzle being disposed at an angle to the axis of said tube and means in said nozzle for directing streams of welding gases downwardly over the surface of rod of plastic welding material as the rod is moved through the axial bore of said nozzle and onto the material being welded.

3. Apparatus as described in claim 2 including a web secured to said tube and guide means for the rod of welding material carried by said web.

4. Apparatus as described in claim 2 in which said means for directing streams of welding gases downwardly over the rod of plastic welding material include an axially bored thimble to receive the welding rod, a circumferential groove in said thimble communicating with said tube, and a plurality of conduits arranged circumferentially within said thimble and around its axial bore communicating with said groove and discharging downwardly toward the welding rod.

5. In welding apparatus for plastic materials including a source of heat for the welding gases having a discharge conduit for the heated gases, a base secured to said source of heat, a rotatable conical plug in said base, a tube mounted in said plug for rotation in a vertical plane and communicating through said plug and said base with the discharge conduit, shoulders on said base engaging said tube for limiting rotation thereof, an axially bored nozzle mounted on and communicating with said tube said axial bore receiving a rod of plastic welding material and being disposed at an angle to the axis of said tube and means in said nozzle for directing streams of welding gases downwardly over the surface of the welding rod and onto the material being welded.

6. Apparatus as described in claim 5 including a web secured to said tube and guide means for the welding rod carried by said web.

7. In a welding nozzle for welding plastic materials, a base, a conduit in said base for hot welding gases, a tube mounted in said base for limited rotation in a vertical plane, a nozzle secured to and communicating with said tube, guide means for a rod of plastic welding material including an axial bore in said nozzle to receive the rod, and means in said nozzle for directing hot welding gases downwardly over the surface of the welding rod and onto the material being welded.

8. A nozzle as described in claim 7 including a web secured to said tube and a guide for the welding rod carried by said web.

9. A nozzle as described in claim 7 in which said means in said nozzle for directing hot welding gases over the welding rod include an axially bored thimble to receive the welding rod, and a plurality of conduits in said thimble communicating with said tube and discharging around said axial bore downwardly toward the welding rod and the material being welded.

References Cited in the file of this patent

UNITED STATES PATENTS

| | | |
|---|---|---|
| 2,220,545 | Reinhardt | Nov. 5, 1940 |
| 2,515,136 | Pigott | July 11, 1950 |